United States Patent Office 3,274,195
Patented Sept. 20, 1966

---

3,274,195
BARBITURIC ACID DERIVATIVES
Shigeo Senda, Gifu, Hajime Fujimura, Kyoto, and Hiroshi Izumi, Gifu, Japan, assignors to Takeda Chemical Industries, Ltd., Osaka, Japan
No Drawing. Filed June 18, 1964, Ser. No. 376,219
Claims priority, application Japan, Oct. 5, 1961, 36/36,324; Apr. 26, 1962, 37/17,087; July 26, 1962, 37/31,819
13 Claims. (Cl. 260—257)

The present application is a continuation-in-part of copending application Serial No. 228,020, filed October 3, 1962, now Patent No. 3,243,344.

This invention relates to novel compounds useful as anti-inflammatory agents. More concretely stated, the invention concerns a series of 5-substituted 1-cyclohexyl barbituric acids and their salts.

Inflammation is one of the most common symptoms observed in clinical fields, and it is known that many diseases are engendered thereby, but clinical physicians have often met with difficulties in removing this symptom in the therapy of various diseases. To eliminate such harmful symptom as soon as possible or to prevent the symptom from occurring is very important for shortening the term of disease and removing pain as quickly as possible.

Presently prevailing anti-inflammatory agents can be divided into two groups; one constituted by steroidal anti-inflammatory agents, i.e., adrenocortical hormones such as prednisolone, triamcinolone, or the like, and the other being constituted by non-steroidal anti-inflammatory agents which consist mainly of pyrazolidine derivatives such as phenylbutazone, oxyphenbutazone, 1,4-diphenyl-3,5-dioxopyrazolidine, or the like. However, those of the former group provoke hypofunction of the anterior pituitary gland and atrophy of adrenal cortex when they are used for a slightly prolonged period and those of the latter group often disturb the normal functions of kidney, liver, heart, etc., so that both necessitate careful administration to patients, especially those whose illness involves any hormonic and metabolic mechanism and/or functions of their viscera such as kidney, liver, heart, etc. Therefore, debut of such an anti-inflammatory agent safely administrable to patients in a wide field of inflammatory conditions has long been a desideratum in the art.

This desideratum is realized by the present invention which embodies a series of novel barbituric acid derivatives represented by the Formula I:

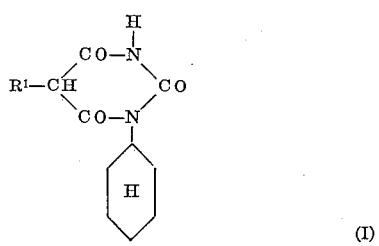

(I)

where $R^1$ stands for a hydrocarbon residue having up to six carbon atoms. These new compounds are not only very effective in anti-inflammatory activity but have far less side-effects than those observed in the aforementioned known anti-inflammatory agents.

Otherwise stated, the present invention embodies a group of novel and useful barbituric acid derivatives as a new-type of non-steroidal anti-inflammatory agents having higher activity than the known non-steroidal anti-inflammatory agents and with substantially no side-effect.

The new compounds I can be prepared in a variety of ways:

(A) A malonic acid derivative represented by the Formula II is allowed to react with cyclohexylurea or 1,3-dicyclohexylurea:

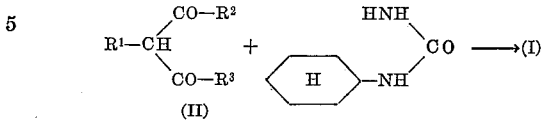

where $R^1$ has the same significances as in Formula I, and $R^2$ and $R^3$ are respectively a hydroxyl, an alkoxy, an aryloxy, or an aralkyloxy group or a halogen atom.

The malonic acid derivative to be used as a starting material in procedure A can be exemplified by an α-substituted malonic acid such as methylmalonic acid, ethylmalonic acid, propylmalonic acid, isopropylmalonic acid, propenylmalonic acid, isopropenylmalonic acid, butylmalonic acid, sec-butylmalonic acid, iso-butylmalonic acid, but-2-enylmalonic acid, but-3-enylmalonic acid, amylmalonic acid, iso-amylmalonic acid, hexylmalonic acid, cyclohexylmalonic acid, cyclohex-1 (or 2 or 3)-enylmalonic acid, cyclohexa-1,3-(or -1,4- or 2,4-)dienylmalonic acid, phenylmalonic acid, cyclopentylmalonic acid, cyclopent-1 (or 2, or 3)-enylmalonic acid, cyclopenta-1,3-(or -2,4-)dienylmalonic acid, or a chemical equivalent thereof; an ester of said α-substituted malonic acids such as a methyl ester, an ethyl ester, a propyl ester, a hexyl ester, a decyl ester, a myristyl ester, a stearyl ester, phenyl ester, a toluyl ester, benzyl ester, phenethyl ester, or the like of the malonic acids, as well as an acid halide of said α-substituted malonic acids or of their hemiesters as exemplified by an acid chloride, an acid bromide and an acid iodide.

In the reaction of this procedure (A), when a malonic acid ester derivative is used as a starting material, the reaction is brought about desirably in the presence of an alkaline catalyst for condensation, for example, an alkali metal alcoholate—such as sodium methylate, potassium methylate, sodium ethylate, potassium ethylate, or the like, magnesium alcoholate—such as magnesium methylate, magnesium ethylate, or the like, an alkali metal—such as sodium or potassium, magnesium, and so on. The reaction is usually accelerated by heating. As the solvent for the reaction, there is usually employed a lower aliphatic alcohol such as methanol, ethanol, propanol and butanol, but there can be employed any solvents other than the lower aliphatic alcohol so long as they do not disturb the course of the reaction. It is in any event desired that the solvent be as anhydrous as possible. After the reaction, the solvent used is removed from the reaction mixture and the residue, after being washed with water if required, is dissolved in water at an alkaline pH. The alkaline solution is acidified to precipitate the objective compound. As the malonic acid ester derivative, a lower alkyl ester such as a methyl ester, an ethyl ester or a propyl ester is generally suitable for the reaction to proceed smoothly, but an ester such as a phenyl ester, benzyl ester or a higher alkyl ester may, of course, be employed, if desired.

When the malonic acid derivative is a free carboxylic acid, i.e. $R^2$ and $R^3$ are both hydroxyl groups, the reaction can be accelerated by heating a mixture of both starting materials in the presence of a dehydrating agent for condensation such as phosphorus pentachloride, phosphorus pentoxide, phosphoryl chloride, polyphosphoric acid (a mixture of phosphoric acid and phosphorus pentoxide), thionyl chloride, concentrated sulfuric acid, etc. This reaction may be carried out without solvent. However, if desired, an anhydrous organic solvent such as chloroform, acetone, benzene, toluene, etc., or a mixture of two or more of them may be used as long as it does not disturb the course of reaction. Upon completion of the reaction, distillable substances are removed by distillation under reduced pressure and the residue is washed with water. The water-insoluble residue is dissolved in an aqueous alkali solution and the solution is acidified to precipitate the objective compound.

When the malonic acid derivative is an acid halide, i.e., $R^2$ and $R^3$ are both halide atoms, the reaction takes place with generation of halide. However, it is generally preferable to accelerate the reaction with heating. Solvent is usually unnecessary for this reaction, too, but, if desired, an anhydrous organic solvent such as acetone, benzene, toluene, or the like may be used. Moreover, the reaction may be accelerated by adding as an acid acceptor such an inorganic base as an alkali metal hydroxide (e.g. sodium hydroxide, potassium hydroxide, etc.), an alkaline earth metal hydroxide (e.g. calcium hydroxide, magnesium hydroxide, etc.), an alkali metal carbonate (e.g. sodium carbonate, potassium carbonate, sodium hydrogen carbonate, etc.) or the like, or such an organic base as pyridine, quinoline, dimethylaniline, diethylaniline or any other tertiary amine.

(B) Cyclohexylurea is allowed to react with a cyanoacetic acid derivative represented by Formula III to give an imide of a barbituric acid represented by Formula IV, followed by hydrolysis to obtain the objective barbituric acid derivative I:

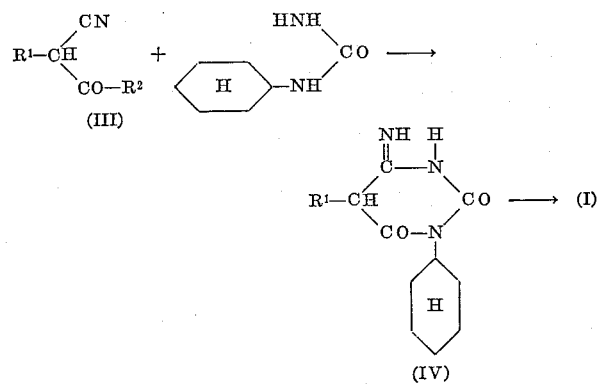

where $R^1$ has the same meaning as in Formula I and $R^2$ is a halogen atom, a hydroxyl, an alkoxy, an aryloxy or an aralkyloxy group.

As the cyanoacetic acid derivative to be used as one of the starting materials of procedure 3, for example, an α-cyanocarboxylic acid such as α-cyanopropionic acid, α-cyanobutyric acid, α-cyanovaleric acid, α-cyanoisovaleric acid, 2-cyanobut-3-enoic acid, 2-cyanopent-3(or 4)-enoic acid, 2-cyano-3-methylbut-3-enoic acid, α-cyanocaproic acid, 2-cyano-3(or 4)-methylpentanoic acid, 2-cyano-3,3-dimethylbutanoic acid, 2-cyanohex-3(or 4 or 5)-enoic acid, α-cyanoenanthic acid, 2-cyano-3(or 4 or 5)-methylhexanoic acid, α-cyanocaprylic acid, α-cyano-α-cyclohexylacetic acid, α-cyano-α-cyclohex-1(or 2 or 3)-enylacetic acid, α-cyano-α-cyclohexa-1,3-(or -1,4- or -2,4-)dienylacetic acid, α-cyano-α-phenylacetic acid, α-cyano-α-cyclopent-1(or 2 or 3)-enylacetic acid, α-cyano-α-cyclopenta-1,3-(or -2,4-)dienylacetic acid, or a chemical equivalent thereof, an ester of said α-cyanocarboxylic acids such as a methyl ester, an ethyl ester, a propyl ester, a hexyl ester, a decyl ester, a myristyl ester, a stearyl ester, a phenyl ester, a toluyl ester, a benzyl ester, a phenethyl ester, or the like of the cyanoacetic acids, and an acid halide of said α-cyanocarboxylic acids such as an acid chloride, an acid bromide or an acid iodide of said α-cyanocarboxylic acids. Among these starting materials, a lower alkyl ester such as methyl ester, ethyl ester or the like is especially advantageous for this purpose, but any of other esters, free acids or acid halides can also be employed for the reaction of this procedure (B).

The condensation reaction can be carried out substantially in the same manner as in procedure (A). In procedure (B), a starting material is a cyanoacetic acid derivative (III) as exemplified above in place of a malonic acid derivative (II) in procedure (A), and the condensation product is an imino compound (IV) in procedure (B), while procedure (A) provides directly the objective barbituric acid derivative I.

Otherwise stated, when a cyanoacetic acid ester derivative is used as a starting material, the reaction is carried out desirably in the presence of an alkaline condensation catalyst, for example, an alkali metal alcoholate—such as sodium methylate, potassium methylate, sodium ethylate, or the like, magnesium alcoholate—such as magnesium methylate, magnesium ethylate, or the like, an alkali metal—such as sodium, potassium, or the like, magnesium, etc. The reaction is usually accelerated by heating. As the solvent for the reaction, there is usually employed a lower aliphatic alcohol such as methanol, ethanol, propanol and butanol, but there can be employed any solvents other than the lower aliphatic alcohol so long as they do not disturb the reaction. It is desired that the solvent be as anhydrous as possible. Upon completion of the reaction, the solvent used is removed from the reaction mixture and the residue, after being washed with water if required, is dissolved in water at an alkaline pH. The alkaline solution is acidified to precipitate the objective compound. As the cyanoacetic acid ester derivative, a lower alkyl ester such as a methyl ester, an ethyl ester or a propyl ester is generally suitable for the reaction to proceed smoothly, but such an ester as a phenyl ester, benzyl ester or a higher alkyl ester may, of course, be employed, if desired.

When the cyanoacetic acid derivative is a free carboxylic acid, i.e. $R^2$ is a hydroxyl group, the reaction is accelerated by heating a mixture of both starting materials in the presence of a dehydrating agent for condensation such as phosphorus pentachloride, phosphorus pentoxide, phosphoryl chloride, polyphosphoric acid (a mixture of phosphoric acid and phosphorous oxide), thionyl chloride, concentrated sulfuric acid, etc. This reaction may be carried out without solvent. However, if desired, an anhydrous organic solvent such as chloroform, acetone, benzene, toluene, etc. or a mixture of two or more of these may be used so long as it does not disturb the reaction. Upon completion of the reaction, distillable substances are removed by distillation under reduced pressure and the residue is washed with water. The water-insoluble residue is dissolved in an aqueous alkali solution and the solution is acidified to precipitate the objective compound.

When the cyanoacetic acid derivative is an acid halide, i.e. $R^2$ is a halogen atom such as chlorine or bromine, the reaction takes place with generation of hydrogen halide. However, it is generally preferable to accelerate the reaction with heating. Solvent is usually unnecessary for this reaction, but, if desired, an anhydrous organic solvent such as acetone, benzene, toluene, or the like may be used. Moreover, the reaction may be accelerated by adding as an acid acceptor an inorganic base such as an alkali metal hydroxide (e.g. sodium hydroxide, potassium hydroxide, etc.), an alkaline earth metal hydroxide (e.g. calcium hydroxide, magnesium hydroxide, etc.), an alkali metal carbonate (e.g. sodium carbonate, potassium carbonate, sodium hydrogen carbonate, etc.) or the like, or an organic base such as pyridine, quinoline, dimethylaniline, diethylaniline or any other tertiary amines.

The so-obtained imide compound of the formula IV is then hydrolyzed by acid hydrolysis. The reaction is brought about by heating the imide derivative in an aqueous medium containing an acid catalyst such as hydrochloric acid, hydrobromic acid, sulfuric acid or any chemical equivalent thereof. Of course, the hydrolysis can be effected by the use of strongly acid cation exchange resins for the same purpose.

(C) A malonic acid amide derivative represented by Formula V is allowed to react with a carbonic acid derivative of Formula VI:

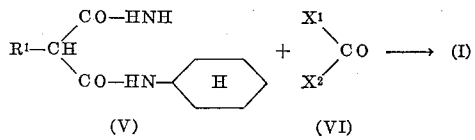

(V)                    (VI)

where $R^1$ has the same significance as in Formula I, and $X^1$ and $X^2$ are respectively a halogen atom such as chlorine or bromine or a lower alkoxy such as methoxy, ethoxy, propoxy or butoxy.

The reaction can take place without heating. However, it is generally desirable to accelerate the reaction by heating. Solvent may be unnecessary for this reaction, but, if required, an anhydrous organic solvent such as acetone, benzene, toluene or the like, or a mixture thereof may be used. Moreover, the reaction may be accelerated by the addition of an acid acceptor, which may be exemplified by an inorganic base such as an alkali metal hydroxide (e.g. sodium hydroxide, potassium hydroxide, etc.), an alkaline earth metal hydroxide (e.g. calcium hydroxide, magnesium hydroxide, etc.), an alkali metal carbonate (e.g. sodium carbonate, potassium carbonate, sodium hydrogen carbonate, etc.) or the like, or an organic base such as pyridine, quinoline, dimethylaniline, diethylaniline or any other tertiary amine. In addition, when the carbonic acid derivative used is a halocarbonic acid ester or a carbonic acid diester, there may be further used an alkali alcoholate such as sodium methylate, potassium methylate, calcium methylate, magnesium methylate, sodium ethylate, potassium ethylate, sodium propylate, sodium butyl alcoholate, or the like.

(D) An ureide of malonic acid derivatives which is represented by Formula VIII is treated with alkaline agent to form the objective compound I by intramolecular ring-closure:

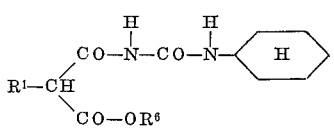

(VII)

where $R^1$ has the same meaning as in Formula I, and $R^6$ is a hydrocarbon residue such as an alkyl (e.g. methyl, ethyl, propyl, butyl, decyl, myristyl, etc.), an aryl (e.g. phenyl, toluyl, etc.) or an aralkyl (e.g. benzyl, phenethyl, etc.) residue. The reaction is accelerated by the presence of an alkaline agent such as sodium hydroxide, potassium hydroxide, sodium carbonate, potassium carbonate, barium hydroxide, trisodium phosphate, sodium methylate, sodium ethylate, or any chemical equivalent thereof, and the reaction may take place at room temperature, but is accelerated by suitably heating the reaction mixture.

As the alkaline agent is usually employed in the form of an aqueous solution, it is not necessary to employ any other solvent for the reaction, but a suitable solvent which does not disturb the reaction may be used, depending on the circumstances. Upon completion of the reaction, the reaction mixture is weakly acidified with an acid such as hydrochloric acid, hydrobromic acid, sulfuric acid, acetic acid, or chemical equivalent thereof, with cooling if desired, and then the objective compound can be separated out of the solution.

(E) A malonic acid monoamide derivative represented by the Formula VIII is allowed to react with a carbamic acid derivative represented by the Formula IX:

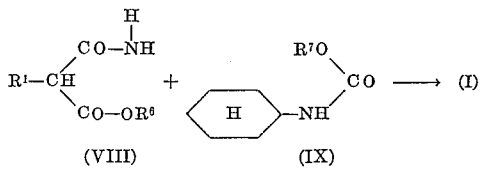

(VIII)                    (IX)

where $R^1$ has the same meaning as in Formula I, and $R^6$ and $R^7$ are respectively a hydrocarbon residue such as an alkyl (e.g. methyl, ethyl, propyl, butyl, decyl, myristyl, etc.) an aryl (e.g. phenyl, toluyl, etc.) or an aralkyl (e.g. benzyl, phenethyl, etc.) residue.

As the malonic acid amide derivative, it is desirable to use an amide of malonic esters, especially that of the lower alkyl ester, though amides of the higher alkyl esters, of the aryl esters or of the aralkyl esters can be used for the same purpose. The reaction is accelerated by the presence of an alkaline agent such as sodium methylate, sodium ethylate, potassium methylate, potassium ethylate, sodium amide, metallic sodium, metallic potassium or any chemical equivalent thereof. Usually, heating is desirable to allow the reaction to take place smoothly.

As the solvent for the reaction, alcohols such as methanol, ethanol, propanol and butanol are usually employed, but any organic solvent generally used can also be employed so long as it does not disturb the course of the reaction.

(F) Ammonia or cyclohexylamine is allowed to react with an ester of a malonic acid N-cyclohexyl amide derivative or an ester of a malonic acid amide derivative, both esters being represented by the Formula X, to allow the reaction of the following equation to take place:

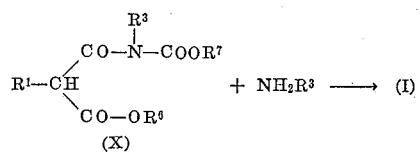

(X)

where $R^1$ has the same meaning as in Formula I, one of $R^2$ or $R^3$ is hydrogen and the other is cyclohexyl and $R^6$ and $R^7$ are respectively a hydrocarbon residue such as a lower alkyl, an aryl or an aralkyl.

The group —$COOR^7$ is an ester group, and the Formula X, therefore, shows that the starting material can also be regarded as a carbamic acid derivative as well as a malonic acid imide derivative. As the starting materials, it is generally preferable to use those wherein the group $R^7$ is a lower alkyl such as methyl, ethyl, propyl, or the like, although those having as the group $R^7$ any other group such as a higher alkyl (e.g. hexyl, decyl, myristyl, stearyl, etc.), an aryl (e.g. phenyl, toluyl, etc.), or an aralkyl (e.g. benzyl, phenethyl, etc.) can also be employed for the reaction of this procedure (F).

The reaction of this procedure (F) is generally accelerated by heat. Furthermore, the presence of an alkali metal alcoholate such as sodium methylate, sodium ethylate, potassium methylate, potassium ethylate, or the like in the reaction system can also accelerate the procedure of the reaction. As a solvent for this reaction, any of the solvents generally used can be employed so long as it does not disturb the reaction.

The starting material of Formula X is prepared by, for example, allowing an alkyl, aryl or aralkyl haloformate to react with the corresponding ester of malonic acid amide with the elimination reaction of hydrohalic acid.

(G) An aldehyde or a ketone, both having up to six carbon atoms, is allowed to react with 1-cyclohexylbarbituric acid to form a 5-alkylidene-1-cyclohexylbarbituric acid represented by the Formula XI, and the intermediate is reduced to give the objective compound I:

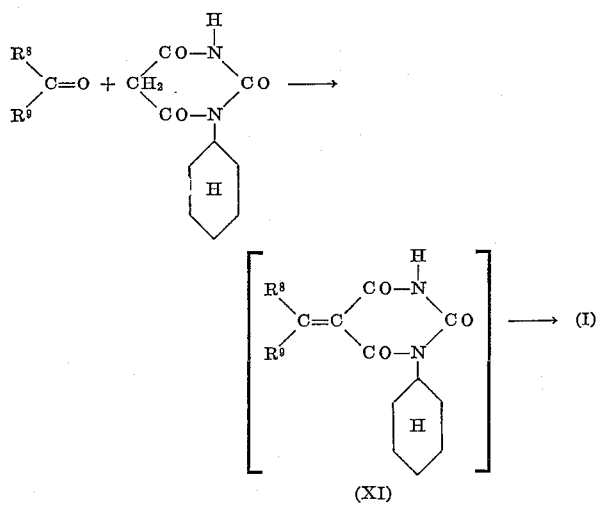

where $R^8$ and $R^9$ are respectively a hydrogen or a lower alkyl, or jointly stand for cycloalkyl, and the total of carbon atoms of $R^8$ and $R^9$ is not more than five.

1-cyclohexylbarbituric acid can be prepared, for example, (1) by the condensation reaction between malonic acid or its reactive derivative (e.g. acid chloride, acid bromide, methyl ester, ethyl ester or the like) and cyclohexylurea, (2) by a reaction between an ester of malonic acid N-mono-cyclohexyl diamide or an ester of malonic acid N,N'-dicyclohexyldiamide and phosgene or carbonyl bromide, or by other means similar to the process for producing known barbituric acids.

As the aldehyde to be used as the starting material, there may be mentioned, for example, formaldehyde, acetaldehyde, propylaldehyde, acrolein, butylaldehyde, 2-methylpropanal, amylaldehyde, 2(or 3)-methylpentanal, 2,2-dimethylpropanal, hexylaldehyde, 2(or 3 or 4)-methylpentanal, 2,2(or 3,3)-dimethylbutanal, 2(or 3)-ethylpropanal, etc., and the ketone can be exemplified by acetone, methyl ethyl ketone, diethyl ketone, vinyl ethyl ketone, ethyl propyl ketone, ethyl isopropenyl ketone, cyclohexanone, cyclopentanone, cyclohex-2(or 3)-enone, cyclopent-2(or 3)-enone, etc.

As stated above, this procedure (G) for the production of the objective compounds I consists of condensation and hydrogenation (or reduction) reactions. These reactions can be carried out simultaneously or in the order of reduction after condensation.

When it is intended to carry out both reactions simultaneously, i.e. in one step, the aldehyde or ketone should be allowed to react with 1-cyclohexylbarbituric acid under reducing conditions, which can be realized by adding a reducing agent to the reaction system or by introducing hydrogen gas to the reaction medium in the presence of a suitable catalyst.

The reducing agent can be selected from generally known reducing agents which are exemplified by a metal and an acid (the metal being tin, iron, zinc-amalgam, etc. and the acid being hydrochloric acid, acetic acid, sulfuric acid, etc.), a metal and an alcohol (the metal being sodium, lithium, aluminum, magnesium-amalgam, zinc, etc. and the alcohol being methanol, ethanol, etc.), a metal such as sodium, sodium-amalgam, magnesium, magnesium-amalgam, aluminum-amalgam, zinc, iron, etc., a metal and an alkali (the metal being aluminum, zinc, etc. and the alkali being sodium hydroxide, potassium hydroxide, etc.), as well as stannous chloride, ferrous chloride, complex metal hydride and any chemical equivalent thereof.

The catalyst for the catalytic reduction can be exemplified by those of the platinum series (e.g. platinum sponge, platinum black, platinum plate, platinum oxide, colloidal platinum, etc.), those of the palladium series (e.g. colloidal palladium, palladium sponge, palladium black, etc.), those of the nickel series (e.g. reduced nickel, nickel oxide, Raney nickel, Urushibara nickel, etc.), and other metals of metal compounds belonging to the cobalt series, copper series, iron series, molybdenum series, tungsten series, zinc series, or the like, those consisting of two or more of the above-mentioned metals and/or metal compounds (i.e. binary catalysts, multiple catalysts or alloy catalysts) and those of the above-mentioned catalysts supported on a carrier such as diactomaceous earth, clay, active carbon, silica, alumina, asbestos or the like. Although, theoretically stated, one mole of hydrogen per mole of the starting barbituric acid derivative is absorbed during the reaction, an excess amount of hydrogen may be conducted into the reaction system.

A solvent for the reaction is suitably selected in accordance with the means for reduction, and as the solvent there are usually employed alcohols such as methanol, ethanol, etc., ethers such as ether, dioxane, tetrahydrofuran, etc., carboxylic acid esters such as methyl acetate, ethyl acetate, etc.; but any of solvents used for chemical reactions may be employed so long as they do not disturb the reaction. The reaction may be carried out at room temperature or under heating. The reaction can be carried out at atmospheric pressure, but it may be carried out at an elevated pressure, if desired. Moreover, the reaction, especially the condensation, may be accelerated by the addition of a catalytic amount of piperidine acetate-acetic acid, ammonium acetate-acetic acid, or the like in the reaction system.

When it is desired to effect the condensation and the hydrogenation subsequently, the intermediate may be or may not be separated from the reaction mixture of the condensation reaction. The condensation is usually effected in a solvent such as methanol, ethanol, propanol, ether, dioxane, tetrahydrofuran, glacial acetic acid, or the like at room temperature or at an elevated temperature, and under atmospheric pressure or at an elevated pressure. The hydrogenation of the condensation product is brought about in the same manner as mentioned above.

(H) 1-cyclohexylbarbituric acid is alkylated by an alkylating agent such as an alkyl halide, an alkyl sulfate, an alkyl benzene sulfonate, an alkyl toluenesulfonate, etc., the object being to introduce the alkyl moiety thereof into position 5 of the starting barbituric acid derivative:

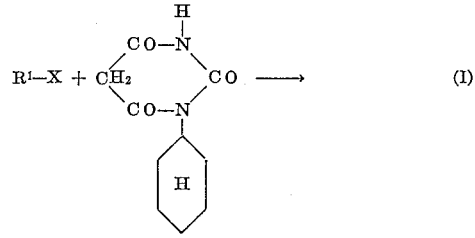

wherein $R^1$ has the same meaning as in Formula I, and X is a halogen atom such as chlorine, bromine and iodine, an equivalent of $SO_4$, a sulfonyloxy such as benzenesulfonyloxy, toluenesulfonyloxy, methanesulfonyloxy, etc.

It should be understood that the alkylation in this procedure (H) is a reaction to introduce a hydrocarbon residue having up to six carbon atoms into the position 5 of the 1-cyclohexylbarbituric acid and includes the case in which a cycloalkyl such as cyclohexyl or cyclopentyl, an alkenyl such as propenyl, vinyl, but-2(or 3)-enyl, pent-2(or 3 or 4)-enyl, or the like, an alkinyl such as but-2-inyl, or the like, a cycloalkenyl such as cyclohex-1(or 2 or 3)-enyl, cyclopent-1(or 2 or 3)-enyl, or the like is introduced into the position 5 of the starting barbituric acid derivative.

The reaction is desirably carried out in the presence of a base as a condensation aid, the base being exemplified by an alkali metal (e.g. sodium, potassium, etc.), an alkali metal alcoholate (e.g. sodium methylate, potassium methylate, sodium ethylate, etc.), an alkali metal hydroxide (e.g. sodium hydroxide, potassium hydroxide, etc.), an alkaline earth metal oxide (e.g. calcium oxide, magnesium oxide, etc.), an alkali metal carbonate (e.g. sodium carbonate, potassium carbonate, sodium hydrogen carbonate, potassium hydrogen carbonate, etc.), an alkali metal acylate (e.g. sodium acetate, potassium acetate, etc.) as well as any of the organic bases such as pyridine, quinoline, dimethylaniline, dimethylformamide, etc.

It is preferable that the reaction be carried out in a suitable solvent. The solvent can be selected, as long as it does not disturb the course of the reaction, from those used in known processes generally, for example, alcohols such as methanol, ethanol, etc., aromatic hydrocarbons such as benzene, toluene, xylene, etc., ethers such as ether, dioxane, tetrahydrofuran, etc., or the like. When an organic base is employed as the condensation aid, the base can function as a solvent, and it is not necessary to use any other solvent.

The reaction is, in general, carried out by heating under reflux at the boiling point of the solvent used. When an alkylating agent of low boiling point such as methyl iodide or ethyl bromide is used, the reaction may preferably be effected in a sealed vessel and accelerated by an elevated temperature and pressure. The alkylation usually ends within about 5-8 hours, but the reaction time may be varied as required.

The objective barbituric acid derivatives I may be isolated in the free acid form or in the form of salt with an alkali such as sodium, potassium, ammonium, calcium, magnesium, or the like. Either form is easily convertible to the other form. For example, the free acid is changed into a desired salt thereof by adding the former to an alcoholic or aqueous medium containing approximately the equivalent amount of the base desired to form the salt, and by concentrating the mixture and/or allowing the same to cool on standing. In the other hand, a salt can be changed into the free acid in manner per se well-known, that is, by neutralizing the former with an acid such as hydrochloric acid, hydrobromic acid, sulfuric acid, cation-exchange resins, etc. Commercially available cation-exchange resins for the process of the present invention include, for example, Amberlite IR-120 (Rohm & Haas Co., Inc., U.S.A.), Dowex 50 (Dow Chemical Co., Inc., U.S.A.), Permutit Q (Permutit Co., Inc., U.S.A.), and Daiaion SK No. 1 (Mitsubishi Chemical Industries, Ltd., Japan).

Thus produced objective compounds of the Formula I, which are novel and useful as anti-inflammatory agents, include:

1-cyclohexyl-5-methylbarbituric acid;
1-cyclohexyl-5-ethylbarbituric acid;
1-cyclohexyl-5-vinylbarbituric acid;
1-cyclohexyl-5-acetylenylbarbituric acid;
1-cyclohexyl-5-propylbarbituric acid;
1-cyclohexyl-5-allylbarbituric acid;
1-cyclohexyl-5-(prop-1-enyl)barbituric acid;
1-cyclohexyl-5-isopropylbarbituric acid;
1-cyclohexyl-5-isopropenylbarbituric acid;
1-cyclohexyl-5-butylbarbituric acid;
1-cyclohexyl-5-(but-1-enyl)barbituric acid;
1-cyclohexyl-5-(but-2-enyl)barbituric acid;
1-cyclohexyl-5-(but-3-enyl)barbituric acid;
1-cyclohexyl-5-(but-2-inyl)barbituric acid;
1-cyclohexyl-5-sec-butylbarbituric acid;
1-cyclohexyl-5-(buta-1,3-dienyl)barbituric acid;
1-cyclohexyl-5-(but-1-en-3-inyl)barbituric acid;
1-cyclohexyl-5-(1-methylprop-1-enyl)barbituric acid;
1-cyclohexyl-5-(1-methylprop-2-enyl)barbituric acid;
1-cyclohexyl-5-iso-butylbarbituric acid;
1-cyclohexyl-5-(2-methylprop-1-enyl)barbituric acid;
1-cyclohexyl-5-(2-methylprop-2-enyl)barbituric acid;
1-cyclohexyl-5-tert-butylbarbituric acid;
1-cyclohexyl-5-pentylbarbituric acid;
1-cyclohexyl-5-(pent-1-enyl)barbituric acid;
1-cyclohexyl-5-(pent-2-enyl)barbituric acid;
1-cyclohexyl-5-(pent-3-enyl)barbituric acid;
1-cyclohexyl-5-(pent-4-enyl)barbituric acid;
1-cyclohexyl-5-(1-methylbutyl)barbituric acid;
1-cyclohexyl-5-(2-methylbutyl)barbituric acid;
1-cyclohexyl-5-(3-methylbutyl)barbituric acid;
1-cyclohexyl-5-(1-ethylpropyl)barbituric acid;
1-cyclohexyl-5-(1,2-dimethylpropyl)barbituric acid;
1-cyclohexyl-5-hexylbarbituric acid;
1-cyclohexyl-5-(1-methylpentyl)barbituric acid;
1-cyclohexyl-5-(2-methylpentyl)barbituric acid;
1-cyclohexyl-5-(3-methylpentyl)barbituric acid;
1-cyclohexyl-5-(4-methylpentyl)barbituric acid;
1-cyclohexyl-5-(1-ethylbutyl)barbituric acid;
1-cyclohexyl-5-(2-ethylbutyl)barbituric acid;
1-cyclohexyl-5-(1,2-dimethylbutyl)barbituric acid;
1-cyclohexyl-5-(1,3-dimethylbutyl)barbituric acid;
1-cyclohexyl-5-(1,1-dimethylbutyl)barbituric acid;
1-cyclohexyl-5-(2,2-dimethylbutyl)barbituric acid;
1-cyclohexyl-5-(3,3-dimethylbutyl)barbituric acid;
1-cyclohexyl-5-(1-ethyl-2-methylpropyl)barbituric acid;
1-cyclohexyl-5-phenylbarbituric acid;
1,5-dicyclohexylbarbituric acid;
1-cyclohexyl-5-(cyclohex-1-enyl)barbituric acid;
1-cyclohexyl-5-(cyclohex-2-enyl)barbituric acid;
1-cyclohexyl-5-(cyclohex-3-enyl)barbituric acid;
1-cyclohexyl-5-(cyclohexa-1,3-dienyl)barbituric acid;
1-cyclohexyl-5-(cyclohexa-1,4-dienyl)barbituric acid;
1-cyclohexyl-5-(cyclohexa-2,4-dienyl)barbituric acid;
1-cyclohexyl-5-cyclopentylbarbituric acid;
1-cyclohexyl-5-(cyclopent-1-enyl)barbituric acid;
1-cyclohexyl-5-(cyclopent-2-enyl)barbituric acid;
1-cyclohexyl-5-(cyclopent-3-enyl)barbituric acid;
1-cyclohexyl-5-(cyclopenta-1,3-dienyl)barbituric acid;
1-cyclohexyl-5-(cyclopenta-1,4-dienyl)barbituric acid;
1-cyclohexyl-5-(cyclopenta-2,4-dienyl)barbituric acid;

as well as the salts thereof with a base, especially one selected from those acceptable pharmaceutically when the salts are to be used as a medicament, such as sodium, potassium, calcium or magnesium.

The novel barbituric acid derivatives thus produced are especially valuable in their physiological activities and their physicochemical properties.

(1) One of the characteristics of the compounds I is their low toxicity as shown by the following:

Tragacanth emulsion of each test compound was administered intraperitoneally or orally to mice (dd-strain) weighing 14 to 15 grams and $LD_{50}$ and 95%-confidence limits were calculated by Litchfield-Wilcoxon method on the basis of the number of mice that died during 24 hours after the administration. The result is shown in Table 1, from which it is seen that the compounds of this invention are significantly less toxic than phenylbutazone or aminopyrine.

TABLE 1

| Test Compound | $LD_{50}$ (95%-C.L.) mg./10 g. in mice | |
|---|---|---|
| | Intraperitoneally | Orally |
| 1-cyclohexyl-5-methylbarbituric acid | 6.16 (5.40-7.02) | |
| 1-cyclohexyl-5-ethylbarbituric acid | 2.41 (2.19-2.65) | |
| 1-cyclohexyl-5-propylbarbituric acid | 3.36 (2.80-4.04) | |
| 1-cyclohexyl-5-isopropylbarbituric acid | 4.10 (3.45-4.88) | |
| 1-cyclohexyl-5-allylbarbituric acid | 3.88 (3.53-4.26) | 5.60 (3.99-7.90) |
| 1-cyclohexyl-5-butylbarbituric acid | 3.31 (2.88-3.81) | 6.80 (5.91-7.82) |
| 1-cyclohexyl-5-sec-butylbarbituric acid | 3.29 (3.02-3.60) | |
| 1-cyclohexyl-5-pentylbarbituric acid | 3.25 (3.04-3.46) | |
| 1-cyclohexyl-5-(1-methylbutyl)barbituric acid | 2.90 (2.63-3.19) | |
| 1,5-dicyclohexylbarbituric acid | 2.90 (2.52-3.34) | 18.60 (14.9-23.2) |
| 1-cyclohexyl-5-phenylbarbituric acid | 2.70 (2.37-3.08) | |
| Phenylbutazone | 2.20 (1.94-2.49) | 3.90 (3.34-4.57) |
| Aminopyrine | | 4.38 (4.14-4.64) |

LD$_{50}$ and 95%-confidence limits were further measured on some typical representatives of the compounds I to show that the toxicity of the same is weaker than that of phenylbutazone or aminopyrine in any cases of oral administration, subcutaneous or intravenous injection as well as intraperitoneal injection.

TABLE 2

| Test Compound | LD$^{50}$ (95%-C.L.) mg./10 g. in mice | | |
|---|---|---|---|
| | Intraperitoneally | Orally | Subcutaneously |
| 1-cyclohexyl-5-methylbarbituric acid | 5.05(3.66–6.98) | 14.3(12.8–14.1) | |
| 1-cyclohexyl-5-allylbarbituric acid | 3.88(3.53–4.26) | 5.60(3.99–7.90) | |
| 1-cyclohexyl-5-butylbarbituric acid | 3.38(2.58–4.36) | 9.20(8.38–10.3) | |
| Phenylbutazone | 2.20(1.94–2.49) | 3.90(3.34–4.57) | |
| Aminopyrine | 2.40(2.26–2.53) | 4.38(4.14–4.64) | 3.15(2.97–3.34) |
| | | Intravenously | |
| Sodium 1-cyclohexyl-5-methylbarbiturate | 7.59(6.97–8.27) | 5.41(4.82–6.05) | |
| Sodium 1-cyclohexyl-5-allylbarbiturate | 3.71(3.17–4.34) | 3.95(3.69–4.23) | 3.71(3.47–4.03) |
| Sodium 1-cyclohexyl-5-butylbarbiturate | 4.61(4.08–5.20) | 3.71(3.44–4.01) | 3.80(3.33–4.33) |
| Sodium salt of phenylbutazone | 2.28(2.06–2.63) | 1.38(1.29–1.48) | 2.57(2.24–2.96) |
| Aminopyrine | | 1.53(1.35–1.76) | |

Investigation of influences of successive administration to animal growth was also carried out. Representative compounds, 1-cyclohexyl-5-allylbarbituric acid, 1-cyclohexyl-5-butylbarbituric acid and 1-cyclohexyl-5 - methylbarbituric acid, as well as phenylbutazone and aminopyrine as positive controls, were respectively administered intraperitoneally to young rats once a day in an amount of each 100 milligrams per kilogram for 15 days, during which body weight of each rat was measured. The growth of the rats to which the compounds of this invention were administered was somewhat inhibited in comparison with normal rats to which no test compound was administered, but the degree of the inhibition was not more than that in the case of aminopyrine. On the other hand, growth of the rats to which phenylbutazone was administered was greatly inhibited and the rats not only could not gain substantial increase of body weight but also two of five rats used died during the test.

(2) Compounds I have an outstanding anti-inflammatory effect.

100 milligrams per kilogram of test compounds were injected intraperitoneally to each of male rats (Wister-strain) weighing 130 to 180 grams used in this test. 30 minutes after the injection, these rats as well as those for control were injected subcutaneously through hind paw with 0.05 cc. of 6% aqueous dextran solution or 0.1 cc. of 10% aqueous egg white solution as substances to provoke inflammatory edema, and the percentages of the maximum inhibition of the edema relative to the control were measured with regard to each test compound. The result is shown in Table 3, from which it is observed that the compounds of the present invention show anti-inflammatory action generally superior to phenylbutazone, and even those having the worst activity among the compounds I show inhibitory action not less than that of phenylbutazone.

TABLE 3

| Test compound | Dextran | Egg white |
|---|---|---|
| 1-cyclohexyl-5-methylbarbituric acid | +3 | +4 |
| 1-cyclohexyl-5-ethylbarbituric acid | +2 | +3 |
| 1-cyclohexyl-5-propylbarbituric acid | +4, +2 | +4, +3 |
| 1-cyclohexyl-5-iso-propylbarbituric acid | +2 | — |
| 1-cyclohexyl-5-allylbarbituric acid | +4 | +2 |
| 1-cyclohexyl-5-butylbarbituric acid | +3, +3 | +4, +3 |
| 1-cyclohexyl-5-sec-butylbarbituric acid | ± | +3 |
| 1-cyclohexyl-5-pentylbarbituric acid | +2, +1 | +3, +3 |
| 1-cyclohexyl-5-(1-methylbutyl)barbituric acid | +2 | +3 |
| 1-cyclohexyl-5-phenylbarbituric acid | +2, +2 | +1, +1 |
| 1,5-dicyclohexylbarbituric acid | +2, +2 | +3, +3 |
| Phenylbutazone | +1 | +3 |
| Aminopyrine | +1 | +3 |

Remarks:
—: Not tested.
±: Inhibition lower than 15%.
+1: 15–25% inhibition.
+2: 26–50% inhibition.
+3: 51–65% inhibition.
+4: Inhibition higher than 65%.

Further examinations were made with respect to typical representatives of compounds I.

One of the further examinations was carried out to determine changes of the inhibitory effect as a function of progress of time after the administration.

After 30 minutes from the time when 100 mg./kg. each of the test compounds was administered intraperitoneally to rats, 0.1 cc. of 10% aqueous egg white solution was injected to the rats as well as those rats as a control to which no test compound was administered. Respective inhibitory activity to inflammatory edema provoked by the injection of egg white is shown in Table 4, from which is clearly seen that the inhibitory effects of the compounds of the present invention are far superior to that of phenylbutazone.

TABLE 4

| Hours | Inhibition to swelling (percent) | | | | | |
|---|---|---|---|---|---|---|
| | 0 | 1 | 2 | 3 | 4 | 5 |
| Test compound: | | | | | | |
| 1-cyclohexyl-5-methylbarbituric acid | 0 | 60 | 69 | 69 | 70 | 84 |
| 1-cyclohexyl-5-allylbarbituric acid | 0 | 64 | 76 | 80 | 90 | 96 |
| 1-cyclohexyl-5-butylbarbituric acid | 0 | 39 | 58 | 58 | 68 | 71 |
| Aminopyrine | 0 | 33 | 48 | 48 | 54 | 58 |
| Phenylbutazone | 0 | 4 | 7 | 8 | 21 | 28 |
| Control | 0 | −1 | −7 | −10 | −12 | −4 |

A similar test was carried out by using 0.05 cc. of 6% aqueous dextran solution in place of egg white solution in the above-mentioned test to give the result as shown in Table 5, from which the same conclusion as above is reached.

TABLE 5

| Hours | 0 | 0.5 | 1 | 2 | 3 | 4 | 5 |
|---|---|---|---|---|---|---|---|
| Test compound: | | | | | | | |
| 1-cyclohexyl-5-allylbarbituric acid | 0 | 74 | 85 | 90 | 93 | 91 | 95 |
| 1-cyclohexyl-5-butylbarbituric acid | 0 | 61 | 64 | 77 | 68 | 72 | 69 |
| Aminopyrine | 0 | 64 | 68 | 61 | 59 | 57 | 57 |
| Phenylbutazone | 0 | 12 | 16 | 15 | 17 | 22 | 23 |
| Control | 0 | −10 | −2 | −18 | −31 | −23 | −20 |

Inhibition to swelling (percent)

Further testing was carried out, where ovalbumin was used as an irritant and the observation was continued for a rather long period, as 20 hours. The result is shown in Table 6, from which it can be seen that the compounds of this invention are not only superior to phenylbutazone in their inhibitory activity to swelling, but also their activity appears immediately after the administration, while that of phenylbutazone does not appear immediately but after some time-lag.

TABLE 6

Inhibition to swelling (percent)

| Hours | 0 | 0.5 | 1 | 2 | 3 | 5 | 7 | 10 | 15 | 20 |
|---|---|---|---|---|---|---|---|---|---|---|
| Test compound: | | | | | | | | | | |
| 1-cyclohexyl-5-methylbarbituric acid | 0 | 39 | 53 | 48 | 50 | 48 | 48 | 41 | 42 | 51 |
| 1-cyclohexyl-5-allylbarbituric acid | 0 | 64 | 70 | 72 | 72 | 72 | 71 | 68 | 53 | 69 |
| 1-cyclohexyl-5-butylbarbituric acid | 0 | 32 | 59 | 64 | 70 | 73 | 73 | 71 | 67 | 67 |
| Aminopyrine | 0 | 45 | 47 | 50 | 49 | 40 | 49 | 45 | 45 | 31 |
| Phenylbutazone | 0 | −5 | 20 | 24 | 24 | 24 | 30 | 34 | 38 | 23 |
| Control | 0 | −1 | −5 | −7 | −14 | −9 | −9 | −2 | −1 | −3 |

The next test was directed to the anti-inflammatory effect of test compounds on the sustained edema provoked by the injection of mustard powder. Mustard powder was suspended in 1% aqueous tragacanth solution to make 0.5% mustard powder suspension, and 0.1 milliliter of the suspension was injected subcutaneously to hind paw of respective rats. For 3 days from 24 hours after the injection of mustard powder, 50 milligrams per kilogram each of test compounds (but the dose of prednisolone was 5 mg./kg. and that of dexamethasone was 1 mg./kg.) was repeatedly administer intraperitoneally every six hours to the rats. The degrees of swelling in percent are shown in Table 7. Along with the observation on swelling, the body weight of rats was measured and the result is shown in Table 8. From these observations, it is shown the compounds of the present invention have strong activity to inhibit the swelling, and the anti-inflammatory activity endures for a time as long as a week or more, while aminopyrine is not durable. The compounds of this invention are thus superior to aminopyrine in activity. All rats to which phenylbutazone was administered died within 48 hours after the start of administering the test compound; thus suggesting how phenylbutazone is toxic to animal bodies, especially when it is successively administered. Although the said dose (50 mg./kg.) of 1-cyclohexyl-5-allylbarbituric acid corresponds to about 1 mg./kg. of dexamethasone in view of their activity to inhibiting swelling per se, the rats to which dexamethasone was administered induced a significant decrease of their body weight. As a conclusion, the compounds of the present invention are more preferable for the therapy of inflammation than any of known steroidal and non-steroidal anti-inflammatory agents.

TABLE 7

Swelling (Percent)

| Days | 0 | 1 | 2 | 3 | 4 | 6 | 8 | 10 |
|---|---|---|---|---|---|---|---|---|
| Test compound: | | | | | | | | |
| 1-cyclohexyl-5-methylbarbituric acid | 0 | 60 | 24 | 19 | 18 | 31 | 34 | 26 |
| 1-cyclohexyl-5-allylbarbituric acid | 0 | 62 | 17 | 8 | −2 | 5 | 5 | 15 |
| 1-cyclohexyl-5-butylbarbituric acid | 0 | 63 | 26 | 14 | 10 | 20 | 30 | 37 |
| Aminopyrine | 0 | 60 | 21 | 30 | 36 | 40 | 41 | 52 |
| Phenylbutazone | 0 | 61 | 19 | (*) | (*) | (*) | (*) | (*) |
| Prednisolone | 0 | 65 | 31 | 26 | 25 | 44 | 39 | 44 |
| Dexamethasone | 0 | 69 | 28 | 7 | −3 | 12 | 16 | 14 |
| Control | 0 | 63 | 48 | 63 | 42 | 39 | 39 | 41 |

*All rats died.

TABLE 8

Body weight (grams)

| Days | 1 | 2 | 3 | 4 | 6 | 8 | 10 |
|---|---|---|---|---|---|---|---|
| Test compound: | | | | | | | |
| 1-cyclohexyl-5-methylbarbituric acid | 135 | 136 | 142 | 137 | 143 | 147 | 154 |
| 1-cyclohexyl-5-allylbarbituric acid | 140 | 140 | 148 | 139 | 141 | 146 | 153 |
| 1-cyclohexyl-5-butylbarbituric acid | 137 | 135 | 134 | 134 | 136 | 145 | 154 |
| Aminopyrine | 138 | 139 | 142 | 138 | 144 | 150 | 155 |
| Phenylbutazone | 143 | 146 | (*) | (*) | (*) | (*) | (*) |
| Prednisolone | 142 | 141 | 145 | 146 | 147 | 153 | 162 |
| Dexamethasone | 141 | 139 | 134 | 125 | 119 | 110 | 124 |
| Control | 140 | 142 | 148 | 147 | 149 | 157 | 163 |

*All rats died.

As to some other irritants such as hyaluronidase or 5-hydroxytryptamine, similar tests were repeatedly carried out with results which give essentially the same conclusion as mentioned above.

(3) It is an interesting property of the compounds of the present invention that a synergic effect is observed between aminopyrine and the compounds of the present invention. Table 9 shows this interesting fact according to the present invention. That is, prior to the injection of irritant, 100 mg./kg. of a mixture consisting of a compound of this invention and the same amount of aminopyrine was administered intraperitoneally to rats, and, after 30 minutes, 0.05 cc. of 6% aqueous dextran solution was injected to hind paw of the rats. The observation was made in the same manner as in the test shown in Tables 4 and 5.

TABLE 9

| Test Compound | Dose (mg./kg.) | Hours | | | | | |
|---|---|---|---|---|---|---|---|
| | | 0 | 1 | 2 | 3 | 4 | 5 |
| | | Inhibition (percent) | | | | | |
| Aminopyrine | 50 | 0 | 52 | 59 | 60 | 61 | 61 |
| 1-cyclohexyl-5-allylbarbituric acid | 50 | | | | | | |
| Aminopyrine | 50 | 0 | 57 | 78 | 76 | 69 | 73 |
| 1-cyclohexyl-5-butylbarbituric acid | 50 | | | | | | |
| Aminopyrine | 50 | 0 | 29 | 28 | 28 | 21 | 12 |
| Phenylbutazone | 50 | | | | | | |
| Aminopyrine | 100 | 0 | 45 | 58 | 56 | 57 | 57 |
| Control | 0 | 0 | 1 | 7 | 2 | −5 | −3 |

The equi-amount mixture of aminopyrine and a compound of the invention shows lower toxicity than that of aminopyrine and phenylbutazone. Each of the test compounds including phenylbutazone was mixed with the same amount of aminopyrine, and the mixture was dissolved in water to prepare 30% aqueous solutions of the respective mixtures. $LD_{50}$ and 95%-confidence limits were measured to give the results shown in Table 10.

TABLE 10

| Test compound | LD$_{50}$ (95%−C.L.) mg./10 g. in mice | |
|---|---|---|
| | Intraperitoneally | Orally |
| Aminopyrine and 1-cyclohexyl-5-allylbarbituric acid. | 4.20 (3.75–4.71) | 6.05 (5.40–6.78). |
| Aminopyrine and 1-cyclohexyl-5-butylbarbituric acid. | 4.26 (4.02–4.52) | 7.20 (6.37–8.14). |
| Aminopyrine and phenylbutazone. | 3.05 (2.85–3.26) | 4.80 (4.53–5.09). |
| Aminopyrine | | 4.49 (3.93–5.12). |
| | Subcutaneously | Intravenously |
| Aminopyrine and sodium 1-cyclohexyl-5-methylbarbiturate. | | 3.28 (2.98–3.16). |
| Aminopyrine and sodium 1-cyclohexyl-5-allylbarbiturate. | 6.45 (6.20–6.72) | 3.92 (3.75–4.18). |
| Aminopyrine and sodium 1-cyclohexyl-5-butylbarbiturate. | 6.15 (5.54–6.76) | 3.78 (3.40–4.20). |
| Aminopyrine and sodium salt of phenylbutazone. | 3.76 (3.26–4.29) | 2.24 (2.10–2.39). |

The alkali metal salts such as the sodium or potassium salts of the novel barbituric acids of the invention are very stable and aqueous solutions thereof are about neutral. For example, the aqueous solutions in which the cited amount (weight per volume percent) of the compound or compounds is dissolved show respectively the following pH at 22° C.:

|  | pH |
|---|---|
| (1) Sodium 1 - cyclohexyl - 5 - methylbarbiturate (15%) | 8.19 |
| (2) Sodium 1-cyclohexyl-5-allylbarbiturate (15%) | 8.1 |
| (3) Sodium 1 - cyclohexyl - 5 - butylbarbiturate (15%) | 8.0 |
| (4) Sodium 1 - cyclohexyl - 5 - methylbarbiturate (15%) and aminopyrine (15%) | 8.25 |
| (5) Sodium 1-cyclohexyl-5-allylbarbiturate (15%) and aminopyrine (15%) | 8.5 |
| (6) Sodium 1-cyclohexyl-5-butylbarbiturate (15%) and aminopyrine (15%) | 8.4 |
| (7) Sodium salt of phenylbutazone (15%) and aminopyrine (15%) (for control) | 9.8 |

The data show that aqueous solutions of the compounds of the present invention are more neutral than that of phenylbutazone even in the state of a mixture with aminopyrine. The neutral pH of the aqueous solutions is in favor of non-irritating injection of the same.

The most interesting property of the alkali metal salts of the barbituric acid derivatives of the invention is that the salts can act in water as a solubilizing agent for aminopyrine, which is well known to be rather not easily soluble in water. Therefore, the aqueous compositions consisting of aminopyrine, a compound of the present invention and pharmaceutically acceptable carrier are very suitable as injectible compositions which are stable and non-irritating as well as very effective owing to the synergy of both compounds.

(4) A manifest synergy in the anti-inflammatory activity was also observed between the compounds of this invention and known steroidal anti-inflammatory agents such as prednisolone, dexamethasone, triamcinolone, and the like. It was also found that the almost threshold dose of the steroidal anti-inflammatory agents is sufficient to exhibit the desirable synergy. From this, it has become possible to lessen the dose of steroidal anti-inflammatory agents. As mentioned introductorily in this disclosure, steroidal anti-inflammatory agents generally have a serious shortcoming that they induce hypofunction of the anterior pituitary or atrophy of adrenal cortex and disturb the maintenance of hormonal and metabolic balances in the animal body, although their anti-inflammatory activity is strong. Thus, a pharmaceutical composition consisting of one or more novel barbituric acid derivatives of this invention and one or more steroidal anti-inflammatory agents and any pharmaceutically acceptable carriers is precisely suitable as a desirable anti-inflammatory composition.

Respective test compounds were intraperitoneally administered to male rats weighing 130 to 150 grams. After 30 minutes from the administration, 0.05 milliliter of 6% aqueous dextran solution was injected to hind paw of each rat. The result of the measurement is shown in Table 11.

TABLE 11

| Test compounds | Dose (mg./kg.) | Hours | | | | | | Sum of percentages |
|---|---|---|---|---|---|---|---|---|
| | | 0 | 1 | 2 | 3 | 4 | 5 | |
| | | Inhibition (percent) | | | | | | |
| Dexamethasone | 0.2 | 0 | 42 | 43 | 43 | 40 | 40 | 208 (a) |
| 1-cyclohexyl-5-butylbarbituric acid | 50 | | | | | | | |
| Prednisolone | 1.0 | 0 | 16 | 31 | 34 | 34 | 31 | 146 (b) |
| 1-cyclohexyl-5-butylbarbituric acid | 50 | | | | | | | |
| 1-cyclohexyl-5-butylbarbituric acid | 50 | 0 | 18 | 21 | 29 | 20 | 20 | 108 (c) |
| Dexamethasone | 0.2 | 0 | 5 | 11 | 13 | 2 | −2 | 29 (d) |
| Prednisolone | 1.0 | 0 | 11 | 6 | −3 | −4 | −5 | 5 (e) |
| Control | | 0 | −14 | −1 | −4 | −10 | −8 | −37 |

(c)+(d)=108+29=137: less than (a) i.e. 208 by 71.
(c)+(e)=108+5=113: less than (b) i.e. 146 by 33.

The active compounds of the present invention may be administered alone or in combination with pharmaceutically acceptable carriers or may be administered, as mentioned above, together with aminopyrine or a steroidal anti-inflammatory agent with or without any other pharmaceutically acceptable carriers, the compounds being in any case administrable as powders, tablets, solutions, emulsions, etc. for oral administration or as injections, suppositories, etc. for non-oral administration. The choice of the carrier is determined by the preferred route of administration, the solubility of the compound and standard pharmaceutical practice. In general, the dosage of these compounds of the invention is approximately of a magnitude of about 7.5 to about 150 milligrams per kilogram of body weight per day. Because of their great anti-inflammatory activity and their low toxicity it is sometimes possible to use dosages of these compounds of greater or less magnitude than that indicated. Especially when these compounds are used together with other anti-inflammatory agents as mentioned above, the dosage may be lessened in accordance with the magnitude of the synergic effect between them.

The following examples are solely for the purpose of illustration and are not to be construed as limitations of this invention, many variations being possible without departing from the spirit or scope of this invention. In the examples as well as in the foregoing description, "mg.," "g.," "kg." and "cc." are abbreviations of milligram(s), gram(s), kilogram(s) and cubic centimeter(s), respectively, and temperatures are all uncorrected. The objective compounds of the respective examples have been confirmed by means of elementary analysis.

*Example 1*

In 200 cc. of absolute alcohol was dissolved 4.6 g. of metallic sodium, and 43 g. of diethyl butylmalonate and 28.4 g. cyclohexylurea were added to the sodium ethylate solution. The mixture was refluxed for 7 hours. After the reaction, ethanol was distilled off and the residue was dissolved in 200 cc. of water. The aqueous solution was treated with active carbon at room temperature and filtered. The filtrate was acidified with hydrochloric acid to give precipitates, which were collected by filtration and recrystallized from methanol to give 1-cyclohexyl-5-butylbarbituric acid as white prisms melting at 84° C. Yield 30 g.

*Example 2*

To an ethanolic sodium ethylate solution which was prepared by dissolving 1.2 g. of metallic sodium in 60 cc. of absolute ethanol were added 8.5 g. of ethyl α-cyanocapronate and 7.1 g. of cyclohexylurea, and the mixture was heated under reflux on water bath for 8 hours. 30%-acetic acid was added to the reaction mixture to adjust the pH of the mixture to weakly acid and the solvent was evaporated to leave crude intermediate. To the residue was added 50 cc. of 30% sulfuric acid, and the mixture was heated under reflux for 3 hours and was allowed to stand to separate crystals, which were filtered, washed and dissolved in an ethanolic sodium ethylate solution prepared from 1.6 g. of metallic sodium and 60 cc. of ethanol. The solution was concentrated under reduced pressure to remove ethanol to leave a residue. The residue was dissolved in 150 cc. of water and filtered, after the treatment with active charcoal, to obtain a filtrate, which was acidified with hydrochloric acid to give crystals of 1-cyclohexyl-5-butylbarbituric acid. The crystals were recrystallized from methanol to give 6.8 g. of colorless needles melting at 84° C.

*Example 3*

In 100 cc. of glacial acetic acid were dissolved 4.2 g. of 1-cyclohexylbarbituric acid and 1.6 g. of butyl aldehyde and the solution was brought into reaction in the same way as in Example 2, in the presence of Raney nickel, to obtain 1-cyclohexyl-5-barbituric acid as white needles melting at 84° C. Yield 2.5 g.

*Example 4*

In a mixture of 60 cc. of water and 60 cc. of ethanol was dissolved 15.7 g. of 1-cyclohexylbarbituric acid under warming. To the solution were added 10.2 g. of sodium acetate and a mixture of 10.7 g. of butyl bromide, 3.8 cc. of water and 90 cc. of ethanol, and the resulting mixture was refluxed on a water bath for 8 hours. Upon completion of the reaction, the reaction mixture was concentrated under reduced pressure. The residue was washed with water and extracted with hot ligroin. The ligroin extract was allowed to stand for cooling, and filtered. The filtrate was concentrated and the residue was distilled under reduced pressure to give 4.1 g. of pale yellow viscous liquid boiling at 180–185° C./0.5 mm. Hg. The viscous substance was recrystallized twice from petroleum ether to obtain 1-cyclohexyl-5-butylbarbituric acid as colorless grains melting at 84° C. Yield 3.1 g.

This product was dissolved under warming in a sodium ethylate solution prepared by dissolving the calculated amount of metallic sodium in ethanol in an amount as little as possible. To the resulting solution was added acetone in a quantity about 5 times as much as the solution, and the mixture was allowed to stand to separate the sodium salt of the product as fine prisms melting at a temperature higher than 235° C.

The sodium salt of the product was dissolved in water and an aqueous calcium chloride solution was added to the sodium salt solution to separate the calcium salt of the product as fine crystals which did not melt even at 300° C.

*Example 5*

In 100 cc. of butanol was dissolved 1.2 g. of sodium, followed by the addition of 10.5 g. of 1-cyclohexylbarbituric acid. The mixture was warmed to dissolve the starting material, and to the solution was added 6.1 g. of allyl bromide. The mixture was refluxed for 5 hours. After the reaction, butanol was distilled off, and the residue was washed with water and dissolved in hot ligroin. The ligroin solution was allowed to stand, filtered and concentrated. The residue was distilled in vacuo to give 3.2 g. of pale yellow viscous liquid boiling at 190–195° C./0.5 mm. Hg. The viscous liquid was dissolved in petroleum ether and the solution was allowed to stand to give 1-cyclohexyl-5-allylbarbituric acid as colorless prisms melting at 98° C. Yield 1.5 g.

This product was dissolved under warming in a sodium ethylate solution prepared from the calculated amount of metallic sodium and ethanol in an amount as little as possible. To the resulting solution was added acetone in a quantity about 5 times as much as the solution, and the mixture was allowed to stand to separate the sodium salt of the product as fine crystals melting at a temperature higher than 244° C.

*Example 6*

The same procedures as in the preceding examples were repeated to obtain the compounds listed below, which are all novel and useful and fall within the scope of the general formula I:

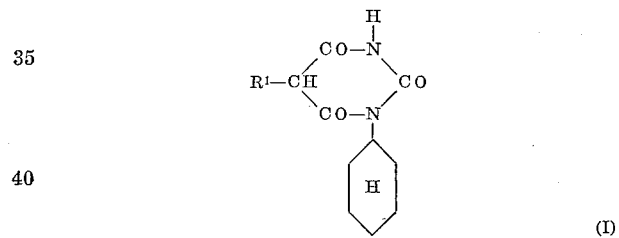

| $R_1$ | Crystal form when recrystallized from methanol | Melting Point (° C.) unless otherwise noted | Procedure of preparation |
|---|---|---|---|
| (1) | (2) | (3) | (4) |
| $CH_3-$ | Needles | [1] 121 | A, B, H |
| $CH_3-CH_2-$ | Prisms | 115 | A, B, C |
| $CH_3-(CH_2)_2-$ | Needles | 103 | A, B |
| $CH_2=CH-CH_2-$ | Prisms | [2] 98 | B |
| $CH_3-CH(CH_3)-$ | do | 108 | A, B |
| $CH_3-(CH_2)_3-$ | Needles | [3] 84 | C |
| $CH_3-CH_2-CH(CH_3)-$ | do | 106 | A, B |
| $CH_3-CH(CH_3)-CH_2-$ | do | 95 | A, B |
| $CH_3-(CH_2)_4-$ | do | 96 | A, B |
| $CH_3-(CH_2)_2-CH(CH_3)-$ | Leaflets | 81 | A, C |
| Cyclohexyl | Needles | 160–161 | A, C |
| Phenyl | do | 167 | A, C |

[1] The sodium salt melts above 222° C.
[2] Boiling Point 190–195° C/0.5 mm. Hg.
[3] Boiling Point 185–187° C/0.8 mm. Hg.

As referred to in the foregoing description, the barbituric acid derivatives can be administered in a variety of forms of composition, some examples of which are as follows:

COMPOSITION 1

100 g. of sodium 1-cyclohexyl-5-butylbarbiturate was dissolved in 1 liter of distilled water for injection, and the solution was filtered sterilely. The filtrate was put in ampules 5 cc. each, and the ampules were sealed to prepare a composition for intramuscular injection.

COMPOSITION 2

To a mixture of 50 g. of sodium 1-cyclohexyl-5-allylbarbiturate, 500 cc. of polyethylene glycol 200, and 5 g.

of phenol was added distilled water for injection so as to make the volume 1 liter. The solution was filtered sterilely. The filtrate was put in ampulses 5 cc. each. After the air in the ampulses was replaced with nitrogen gas, the ampules were sealed to prepare a composition for intramuscular injection.

COMPOSITION 3

50 g. of sodium 1-cyclohexyl-5-methylbarbiturate was dissolved in 1 liter of physiological saline and the solution was filtered sterilely. The filtrate was put in ampules 5 cc. each and the ampules were sealed to prepare a composition for intravenous injection.

COMPOSITION 4

250 mg. of dried and sterile powder of sodium 1-cyclohexyl-5-methylbarbiturate was sterilely sealed in a 10 cc.-ampule. When used, this is dissolved in 10 cc. of 20%-glucose injection to prepare a composition for intravenous injection.

COMPOSITION 5

To a mixture of 20 g. of sodium 1-cyclohexyl-5-butyl-barbiturate, 20 g. of aminopyrine, 5 g. of lidocain, 2 g. of methyl parahydroxybenzoate and 0.3 g. of propyl parahydroxybenzoate was added distilled water for injection so as to make the volume 1 liter, and the solution was filtered sterilely. The filtrate was put in ampules 5 cc. each and the ampules were sealed to prepare a composition for intramuscular injection.

COMPOSITION 6

A mixture of 100 g. of sodium 1-cyclohexyl-5-butyl-barbiturate, 100 g. of aminopyrine and 9 g. of benzyl alcohol was dissolved in distilled water for injection so as to make the volume 1 liter, and the solution was filtered sterilely. The filtrate was put in ampules 5 cc. each. After the air in the ampules was replaced with nitrogen gas, the ampules were sealed to prepare a composition for intramuscular injection.

COMPOSITION 7

A mixture of 0.3 g. of 1-cyclohexyl-5-butylbarbituric acid and 1.7 g. of theobroma oil was melted on heating and then cooled in a suppository mould to prepare a suppository.

COMPOSITION 8

A mixture of 0.3 g. of sodium 1-cyclohexyl-5-barbiturate, 0.7 g. of polyethylene glycol 6000, 0.5 g. of polyethylene glycol 1540 and 0.5 g. of polyethylene glycol 400 was melted on heating and then cooled in a suppository mould to prepare a suppository.

COMPOSITION 9

A mixture of 0.3 g. of sodium 1-cyclohexyl-5-butyl-barbiturate, 1.32 g. of lauric acid and 0.33 g. of palmitic acid was melted on heating and then cooled in a suppository mould to prepare a suppository.

COMPOSITION 10

A mixture of 0.15 g. of sodium 1-cyclohexyl-5-butyl-barbiturate, 0.15 g. of aminopyrine, 1.32 g. of lauric acid and 0.33 g. of palmitic acid was melted on heating and then cooled in a suppository mould to prepare a suppository.

COMPOSITION 11

A mixture of 0.15 g. of 1-cyclohexyl-5-butylbarbituric acid, 0.15 g. of aminopyrine and 1.7 g. of theobroma oil was melted on heating and then cooled in a suppository mould to prepare a suppository.

COMPOSITION 12

Mg. in each tablet
1-cyclohexyl-5-butyl(or allyl)-barbituric acid ____ 100.0
Milk sugar (powder) _____ 200.0
Starch _____ 78.0
Starch paste (dried) _____ 20.0
Magnesium stearate _____ 2.0
———
400.0

The compound and milk sugar were admixed and the admixture was granulated with 15%-starch paste. The granules were dried, screened, lubricated and compressed into tablets. The tablets thus prepared may further be coated with a coating material such as sugar.

COMPOSITION 13

Mg. in each tablet
1-cyclohexyl-5-butyl(or allyl)-barbituric acid ____ 50.0
Aminopyrine _____ 50.0
Milk sugar (powder) _____ 145.0
Starch _____ 40.0
Talc _____ 13.0
Magnesium stearate _____ 2.0
———
300.0

All ingredients were thoroughly admixed and the admixture was compressed into "slugs." The slugs were ground, screened and recompressed into tablets. The tablets thus prepared may further be coated with a suitable coating material such as sugar.

COMPOSITION 14

Mg. in each tablet
1-cyclohexyl-5-butyl(or allyl)-barbituric acid ____ 50.0
Dexamethasone _____ 0.1
Milk sugar (powder) _____ 120.0
Starch _____ 64.9
Ethyl cellulose (50 centipoises) _____ 5.0
Talc _____ 9.5
Stearic acid (powder) _____ 0.5
———
200.0

The barbituric acid derivative, dexamethasone, milk sugar and starch were thoroughly admixed and the admixture was granulated with ethyl cellulose as its 5%-alcoholic solution. The granules were dried, screened, lubricated and compressed into tablets. The tablets thus prepared may further be coated with a suitable coating material such as sugar.

In place of dexamethasone in the above prescription, 1.0 mg. of prednisolone may be used; in this case, the amount of starch is reduced to 64.0 mg.

COMPOSITION 15

Mg.
1-cyclohexyl-5-butyl(or allyl)-barbituric acid ___ 100
Lactose _____ 700
Starch _____ 200
———
1,000

All ingredients were thoroughly admixed to prepare a composition for oral powders.

What is claimed is:
1. A member selected from the class consisting of compounds of the formula

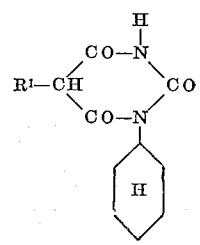

wherein $R^1$ stands for a hydrocarbon residue having up to six carbon atoms, their alkali metal salts and their alkaline earth metal salts.

2. 1-cyclohexyl-5-methylbarbituric acid.
3. 1-cyclohexyl-5-ethylbarbituric acid.
4. 1-cyclohexyl-5-propylbarbituric acid.
5. 1-cyclohexyl-5-allylbarbituric acid.
6. 1-cyclohexyl-5-butylbarbituric acid.
7. 1-cyclohexyl-5-sec-butylbarbituric acid.
8. 1-cyclohexyl-5-pentylbarbituric acid.
9. 1-cyclohexyl-5-sec-pentylbarbituric acid.
10. 1,5-dicyclohexylbarbituric acid.
11. 1-cyclohexyl-5-phenylbarbituric acid.
12. 1-cyclohexyl-5-isopropylbarbituric acid.
13. 1-cyclohexyl-5-isobutylbarbituric acid.

No references cited.

ALEX MAZEL, *Primary Examiner.*

JAMES W. ADAMS, *Assistant Examiner.*